United States Patent
Hein et al.

(10) Patent No.: US 11,965,451 B2
(45) Date of Patent: Apr. 23, 2024

(54) MIXING TUBE

(71) Applicant: TENNECO GMBH, Edenkoben (DE)

(72) Inventors: Eric Hein, Edenkoben (DE); Attila Kovacs, Edenkoben (DE); Michael Flockert, Edenkoben (DE); Yannick Leske, Edenkoben (DE); Rafal Wrobel, Edenkoben (DE); Klaus Schröer, Edenkoben (DE)

(73) Assignee: Tenneco GmbH, Edenkoben (DE)

( * ) Notice: Subject to any disclaimer, the term of this patent is extended or adjusted under 35 U.S.C. 154(b) by 0 days.

(21) Appl. No.: 18/010,657

(22) PCT Filed: Oct. 20, 2021

(86) PCT No.: PCT/EP2021/079063
§ 371 (c)(1),
(2) Date: Dec. 15, 2022

(87) PCT Pub. No.: WO2022/090020
PCT Pub. Date: May 5, 2022

(65) Prior Publication Data
US 2023/0235691 A1    Jul. 27, 2023

(30) Foreign Application Priority Data

Oct. 27, 2020    (DE) .................. 10 2020 128 226.5

(51) Int. Cl.
*F01N 3/28* (2006.01)
*F01N 1/08* (2006.01)
(Continued)

(52) U.S. Cl.
CPC .......... *F01N 3/2892* (2013.01); *F01N 3/208* (2013.01); *F01N 3/30* (2013.01); *F01N 2240/20* (2013.01);
(Continued)

(58) Field of Classification Search
CPC . F01N 3/30; F01N 3/28; F01N 3/2892; F01N 3/208; F01N 3/2066; F01N 3/206;
(Continued)

(56) References Cited

U.S. PATENT DOCUMENTS

2016/0061078 A1 * 3/2016 Schmidt ................ F01N 3/2066
60/295
2021/0340896 A1   11/2021 Albert et al.

FOREIGN PATENT DOCUMENTS

CN          204511594 U  *  7/2015  ................ B01F 3/04
DE      102013114111 A1 *  6/2015  .......... B01F 3/04049
(Continued)

OTHER PUBLICATIONS

English translation of DE 102013114111 by PE2E, Sep. 15, 2023.*
(Continued)

*Primary Examiner* — Deming Wan
(74) *Attorney, Agent, or Firm* — Harness, Dickey & Pierce, P.L.C.

(57) ABSTRACT

The invention relates to a mixer for an exhaust gas system for mixing an additive into an exhaust gas flow of an internal combustion engine, having a first shell and at least a second shell which are arranged successively in the circumferential direction in relation to a center axis, each shell having at least two shell edges that are arranged offset in the circumferential direction and which each form a flow edge, wherein the flow edges of two circumferentially adjacent shell edges of two different shells delimit an inflow opening, such that at least one pipe end arranged coaxially with the center axis is provided with a circumferential pipe profile that has a nominal radius Rn and is used for connection to an exhaust pipe, the pipe end being formed by the circumferentially adjacent shells.

14 Claims, 2 Drawing Sheets

(51) Int. Cl.
  *F01N 1/14*   (2006.01)
  *F01N 3/00*   (2006.01)
  *F01N 3/20*   (2006.01)
  *F01N 3/30*   (2006.01)
  *F01N 3/36*   (2006.01)

(52) U.S. Cl.
  CPC ...... *F01N 2470/10* (2013.01); *F01N 2610/14* (2013.01)

(58) Field of Classification Search
  CPC ............ F01N 2240/20; F01N 2470/20; F01N 13/009; F01N 2610/02; F01N 1/14; F01N 1/087
  See application file for complete search history.

(56) References Cited

FOREIGN PATENT DOCUMENTS

| | | |
|---|---|---|
| DE | 102017101749 A1 | 4/2017 |
| DE | 202019100256 U1 | 2/2019 |
| DE | 102018107690 A1 | 10/2019 |
| WO | 2016180244 A1 | 11/2016 |
| WO | 2020021444 A1 | 1/2020 |
| WO | 2020064853 A1 | 4/2020 |

OTHER PUBLICATIONS

English translation of CN204511594 by PE2E Jan. 25, 2024.*
International Search Report (English and German) and Written Opinion of the ISA (German) issued in PCT/EP2021/079063, dated Feb. 3, 2022; ISA/EP.
German International Preliminary Report on Patentability issued in PCT/EP2021/079063, dated Feb. 3, 2022.

* cited by examiner

MIXING TUBE

CROSS-REFERENCE TO RELATED APPLICATIONS

This application is a U.S. National Phase Application under 35 U.S.C. 371 of International Application No. PCT/EP2021/079063, filed on Oct. 20, 2021, which claims the benefit of German Patent Application No. 10 2020 128 226.5, filed on Oct. 27, 2020. The entire disclosures of the above applications are incorporated herein by reference.

FIELD

The invention relates to a mixer for an exhaust gas system for mixing an additive into an exhaust gas flow of an internal combustion engine, having a first shell and at least a second shell which are arranged successively in the circumferential direction in relation to a center axis, each shell having at least two shell edges that are arranged offset in the circumferential direction and which each form a flow edge, wherein the flow edges of two circumferentially adjacent shell edges of two different shells delimit an inflow opening. The invention relates to a system consisting of a mixer integrated into an exhaust gas treatment portion together with an injector for metering an additive into a mixer.

BACKGROUND

This section provides background information related to the present disclosure which is not necessarily prior art.

A mixing pipe formed of two half-shells is already known from WO 2016/180244 A1. The two half-shells have the same cross-sectional shape over the entire length thereof. A mixing pipe wall is provided at the end to which the two half-shells are fastened.

SUMMARY

This section provides a general summary of the disclosure, and is not a comprehensive disclosure of its full scope or all of its features.

The object of the invention is to design and arrange a mixing pipe so as to ensure an optimum connection to the exhaust gas system while reducing material usage.

The object is achieved according to the invention by at least one pipe end arranged coaxially with the center axis being provided with a circumferential pipe profile that has a nominal radius Rn and is used for connection to an exhaust pipe, the pipe end being formed by the circumferentially adjacent shells.

This ensures that the mixer can be directly connected, via the pipe end provided, to an exhaust pipe to be connected. This is usually done by welding. Both shells are preferably designed as half-shells and have the same geometry, such that the entire mixer can be constructed with a half-shell geometry. The pipe profile is preferably a circular profile. However, provision is also made for cylindrical or elliptical profiles. In the case of the elliptical profile, the nominal radius Rn corresponds to the radius of a semi-axis, as explained in more detail in the exemplary embodiment. To construct the mixer, two identical half-shells are placed against one another, wherein one half-shell is rotated 180° relative to the other half-shell.

For this purpose, it may also be advantageous if the at least two shells are directly form-fittingly and/or integrally and/or force-fittingly connected to one another at the pipe end. The form-fitting, integral and/or force-fitting connection at the pipe end ensures sufficient stability of the mixer formed by two or more shells. In addition, the fastening of the shells to one another at the end ensures that the pipe end is formed with a pipe profile or connection profile for connection to an exhaust pipe or a mixer housing.

Furthermore, it may be advantageous for at least one shell edge of at least one shell to have, in the region of the flow edge, a radially extending indentation with a guiding radius of Re<Rn. The indentation in the region of the shell edge ensures a radial offset thereof such that a corresponding inflow opening is formed or enlarged with respect to the adjacent shell edge. The indentation extends over preferably 20° to 60° and, starting from the flow edge, diminishes continuously from the guiding radius Re to the nominal radius Rn. Thus, the inflow opening or a normal vector thereof is given a directional component in the circumferential direction such that the exhaust gas flowing in in the circumferential direction can enter the inflow opening in a simplified manner and form a vortex flow inside the mixer thanks to the tubular basic shape of the mixer. The indentation is preferably provided on only one shell edge.

It may also be advantageous for at least one shell edge of at least one shell to have, in the region of the flow edge, a radially extending projection with a guiding radius of Ra>Rn. By using a projection in the region of the shell edge, the flow of exhaust gas flowing in the circumferential direction into the inflow opening is therefore improved, or a normal vector N of the inflow opening is oriented in relation to the circumferential direction. The projection likewise diminishes from the guiding radius Ra thereof to the nominal radius Rn in an angular range between 20° and 60°. This facilitates the formation of a vortex flow inside the mixer. The radial offset between the shell edge with the projection and the adjacent shell edge delimits the inflow opening. This advantage is already achieved with the formation of a projection on only one shell edge.

Advantageously, provision may be made for the shell edge of one shell with the indentation to be arranged directly adjacently, in the circumferential direction, to the shell edge of the other shell with the projection. The radial offsets of the shell edge with the indentation and the shell edge with the projection delimit a maximum inflow opening size. By using two shells of the same geometry and a corresponding relative position between the two shells, i.e. pivoting one shell 180°, it is achieved according to the invention that the indentation of one shell is placed adjacent to the projection of the adjacent shell such that the maximum inflow opening size described above is ensured.

It may be of particular importance to the present invention for a second pipe end to be provided with a pipe profile, the axial length of each flow edge being delimited by the two pipe ends. The pipe profile of the second pipe end is preferably the same as that of the first pipe end, i.e. also round or also elliptical. With the formation of the second pipe end, the stability of the mixer formed from at least two half-shells is significantly improved. Both pipe ends thus delimit the axial length of the available flow edges delimiting the inflow opening. The pipe end is likewise formed by the two half-shells; thus, the two half-shells have a corresponding axial edge, with the two edges together forming the pipe end. Both shells or all shells are appropriately form-fittingly and/or integrally connected at the pipe end to fasten the shells to one another.

In connection with the design and arrangement according to the invention, it may be advantageous for each shell to be designed as a half-shell and to extend over 180° to 190° in the circumferential direction.

Furthermore, it may be advantageous for each shell to have an assembly edge at least in the region of one pipe end and at at least one shell edge, each assembly edge resting against the shell edge of the adjacent shell and/or being connected to the shell edge of the adjacent shell in the radial direction. The assembly edge is preferably only provided on one shell edge of the particular shell such that, when using a pair of shells, two assembly edges are accordingly available for connecting the adjacent shell edge. The assembly edge is preferably bent in the radial direction such that, despite the overlap of both shell edges in the circumferential direction, a coaxial alignment of both half-shells or shells with respect to the common center axis is possible. By means of a form-fitting and/or integral connection, the assembly edge is rigidly connected to the adjacent shell edge to be placed against said assembly edge. The assembly edge extends at least over the part of each shell in which a corresponding connection to the adjacent shell is desired. Irrespective of this, the assembly edge may in principle also be arranged in the region of the shell edge which forms a flow edge or a boundary of the inflow opening.

In addition, it may be advantageous for at least one shell or all the shells to be designed as a single-part, single-layer sheet metal part. Thus, it is possible to use simple sheet metal parts that could be produced in a deep drawing process.

Furthermore, it may be advantageous for Rn–Re<=>Ra–Rn. Preferably, the difference between the nominal radius Rn and the guiding radius Re of the indentation is equal to the difference between the nominal radius Rn and the guiding radius Ra of the projection. Other ratios are possible.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantages and details of the invention are explained in the claims and in the description and shown in the figures. In the drawings:

Corresponding reference numerals indicate corresponding parts throughout the several views of the drawings.

DETAILED DESCRIPTION

Example embodiments will now be described more fully with reference to the accompanying drawings.

Figure 1:
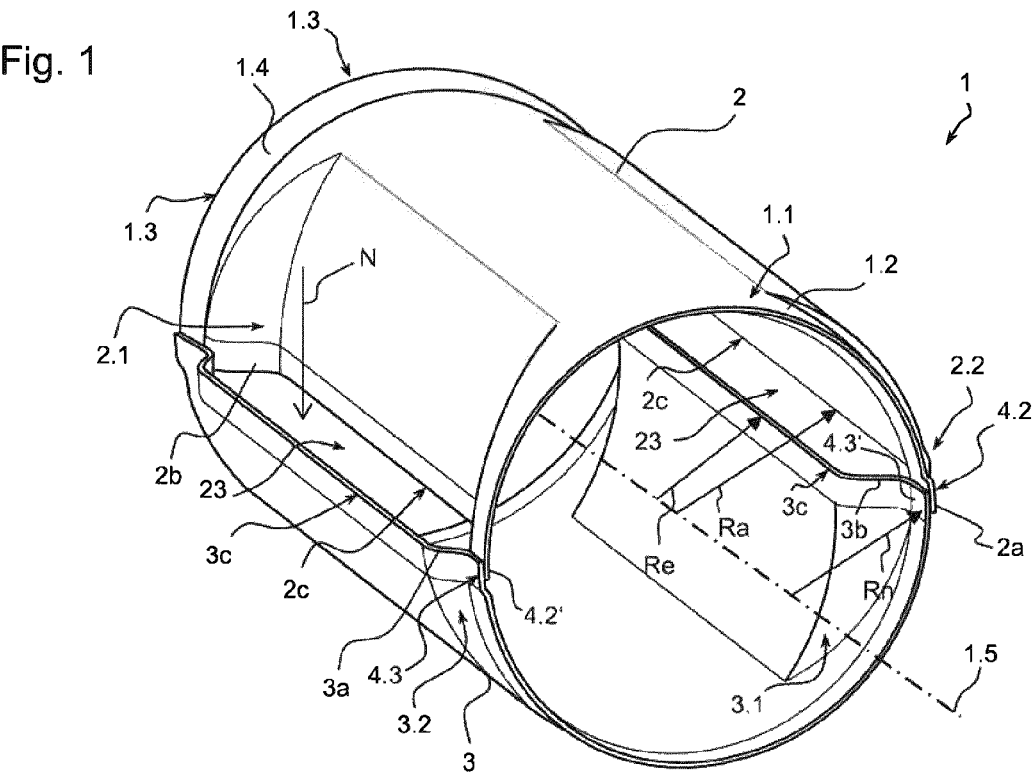
FIG. 1 shows a perspective view of the mixer.

A mixer 1 shown in FIG. 1 is composed of two identical half-shells 2, 3. Each half-shell 2, 3 has an assembly edge 4.2, 4.2', 4.3, 4.3' which can be placed against the shell edge 2b, 3b of the adjacent shell in a radial direction relative to a center axis 1.5 of the mixer 1. One assembly edge 4.2, 4.3 of each half-shell 2, 3 is bent in the radial direction, and the other assembly edge 4.2', 4.3' is not. Each half-shell 2, 3 is delimited in the circumferential direction by two shell edges 2a, 2b, 3a, 3b, respectively. The axial end parts of the shell edges 2a, 2b, 3a, 3b respectively form the assembly edges 4.2, 4.2', 4.3, 4.3'.

In the region of each pipe end 1.1, 1.3, the two assembled half-shells 2, 3 form a pipe profile 1.2, 1.4 with the center axis 1.5 and a circular cross section. In the connection region of the two half-shells 2, 3, the pipe profile 1.2, 1.4 is formed by the axial end assembly edge 4.2, 4.3.

Between the two pipe ends 1.1, 1.3, each shell 2, 3 has an indentation 2.1, 3.1 and a projection 2.2, 3.2. Each pair of indentation and projection 2.1, 2.2, 3.1, 3.2 establishes a radial offset between the relevant shell edges 2a, 2b, 3a, 3b of the size Ra-Re in the region of said shell edges 2a, 2b, 3a, 3b. Ra is the guiding radius of the projection 2.2, 3.2 and Re is the guiding radius of the indentation 2.1, 3.1. The guiding radius Ra of the projection 2.2, 3.2 is larger than the nominal radius Rn of the pipe profile 1.2, 1.3 at the end. The guiding radius Re of the indentation 2.1, 3.1 is smaller than the nominal radius Rn. If the projection 2.2, 3.2 and/or the indentation 2.1, 3.1 is omitted in at least one shell, the guiding radius Ra or the guiding radius Re is equal to the nominal radius Rn.

Each projection 2.2, 3.2 tapers in the circumferential direction and approaches the nominal radius Rn. According to the exemplary embodiment in FIG. 1, this approach takes place over a circumferential angle of about 30°. The same applies to the indentation 2.1, 3.1. Said indentation widens in the circumferential direction and also approaches the nominal radius Rn over a circumferential angle of about 30°. The maxima of the projections 2.2, 3.2 and the indentations 2.1, 3.1 are in the region of the relevant shell edges 2a, 2b, 3a, 3b. The previously described approach towards the nominal radius Rn takes place from the shell edges 2a, 2b, 3a, 3b.

In the region of the projections and indentations 2.1, 2.2, 3.1, 3.2, the relevant shell edge 2a, 2b, 3a, 3b forms a flow edge 2c, 3c which delimits an inflow opening 23. Each inflow opening 23 is delimited by the projection 2.2, 3.2 of one shell 2, 3 and the corresponding indentation 2.1, 3.1 of the other shell 3, 2. Thus, two inflow openings 23 are formed by the shell edges 2a, 2b, 3a, 3b.

The inflow opening 23 has a normal vector N that is approximately tangential to the circumferential direction. The exhaust gas flowing in from outside enters the mixer 1 via the inflow opening 23 with a velocity and direction component directed substantially in the circumferential direction and, due to the cylindrical basic shape of the mixer 1, is guided onwards with a subsequent axial component in a vortex flow.

Figure 2A:
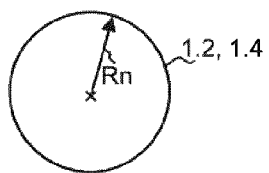
FIGS. 2a-2c show different pipe profiles.
Figure 2B:
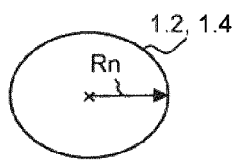
Figure 2C:
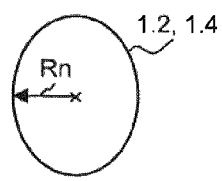

According to the exemplary embodiments shown in FIGS. 2a to 2c, the pipe profile 1.2 can be circular or elliptical. Starting from an inflow opening 23 arranged at the side, the radius of the ellipse at the side is to be referred to as the nominal radius Rn. The same results when the inflow opening 23 is displaced upward or downward in the circumferential direction.

Figure 3:
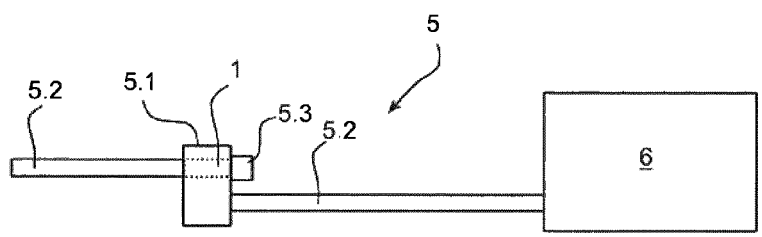
FIG. 3 shows a schematic diagram of an exhaust gas system.

The exemplary embodiment in FIG. 3 relates to an exhaust gas system 5 connected to an internal combustion engine 6. The exhaust system 5 has an exhaust gas treatment portion 5.1 or a mixer housing in which the mixer 1 is arranged. The exhaust gas treatment portion 5.1 is connected to the internal combustion engine 6 or to further exhaust gas treatment devices via an exhaust gas pipe 5.2. Moreover, the exhaust gas treatment portion 5.1 has an injector 5.3 which is placed at a second pipe end 1.3 of the mixer 1 and through which an additive is injected into the mixer 1. The mixer 1 is coupled to the exhaust gas pipe 5.2 via the first pipe end 1.1.

Figure 4:
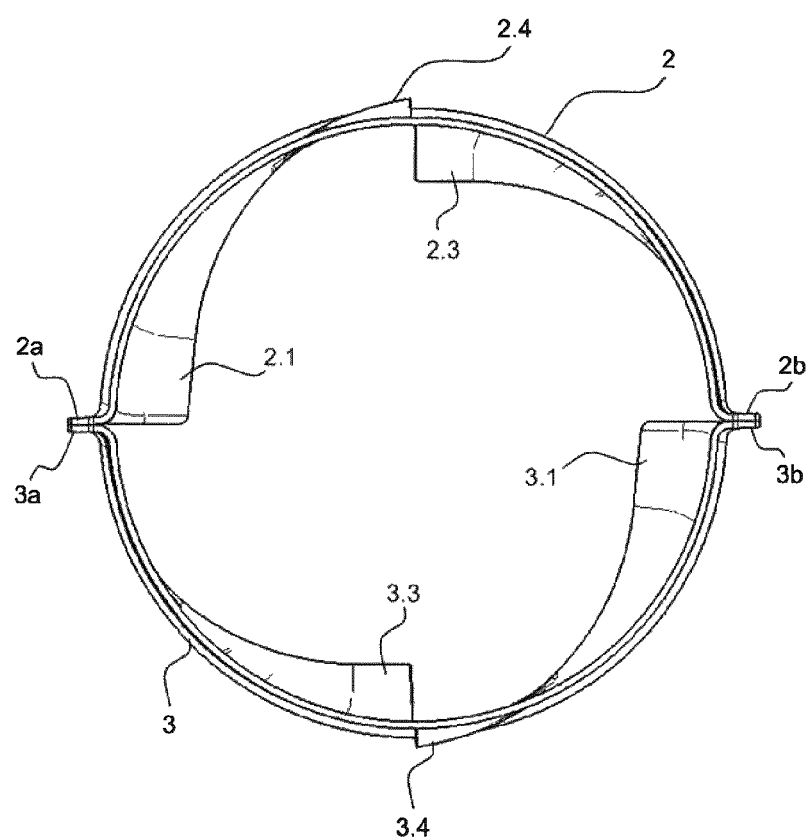
FIG. 4 shows an alternative embodiment of the mixer.

In the region of each shell edge 2a, 2b, 3a, 3b, the alternative embodiment of the mixer 1 shown in FIG. 4 has only an indentation 2.1, 3.1 and does not have a projection. However, a further indentation 2.3, 3.3 and a further projection 2.4, 3.4 are provided in each region between the pairs of shell edges 2a, 2b, 3a, 3b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A mixer for an exhaust gas system for mixing an additive into an exhaust gas flow of an internal combustion engine, having a first shell and at least a second shell which are arranged successively in the circumferential direction in relation to a center axis, each of the shells having at least two shell edges that are arranged offset in the circumferential direction and which each form a flow edge, wherein the flow edges of two circumferentially adjacent shell edges of two different shells delimit an inflow opening,
   wherein
   at least one pipe end arranged coaxially with the center axis is provided with a circumferential pipe profile that has a nominal radius Rn and is used for connection to an exhaust pipe, the pipe end being formed by the circumferentially adjacent shells.

2. The mixer according to claim 1,
   wherein
   the at least two shells are directly form-fittingly and/or integrally and/or force-fittingly connected to each other at the pipe end.

3. The mixer according to claim 1, wherein at least one shell edge of at least one of the shells has, in the region of the flow edge, a radially extending indentation with a guiding radius of Re<Rn.

4. The mixer according to claim 1, wherein at least one shell edge of at least one of the shells has, in the region of the flow edge, a radially extending projection with a guiding radius of Ra>Rn.

5. The mixer according to claim 1, wherein the shell edge of one of the shells with the indentation is arranged directly adjacently, in the circumferential direction, to the shell edge of the other shell with the projection.

6. The mixer according to claim 1, wherein a second pipe end is provided with a pipe profile, the axial length of each of the flow edges being delimited by the two pipe ends.

7. The mixer according to claim 1, wherein each of the shells is designed as a half-shell and extends over 1800 to 190* in the circumferential direction.

8. The mixer according to claim 1, wherein each of the shells has an assembly edge at least in the region of one pipe end and at the at least one shell edge, each of the assembly edges resting against the shell edge of the adjacent shell and/or being connected to the shell edge of the adjacent shell in the radial direction.

9. The mixer according to claim 1, wherein at least one of the shells or all the shells is/are designed as a single-part, single-layer sheet metal part.

10. The mixer according to claim 1,
    wherein $Rn-Re<=>Ra-Rn.$

11. The mixer according to claim 1, wherein each of the shells has a further radially extending indentation in the region between the two shell edges.

12. The mixer according to claim 1, wherein each of the shells has a further radially extending indentation in the region between the two shell edges.

13. A system consisting of a mixer according to claim 1 which is integrated into an exhaust gas treatment portion together with an injector for metering an additive into the mixer.

14. The system according to claim 13,
    wherein
    the exhaust gas treatment portion, together with the mixer, is integrated into an exhaust gas system of an internal combustion engine.

* * * * *